United States Patent
Barrenscheen et al.

(10) Patent No.: US 12,468,642 B2
(45) Date of Patent: Nov. 11, 2025

(54) SERIAL BUS COMMUNICATION WITHOUT READ INDICATION

(71) Applicant: Infineon Technologies AG, Neubiberg (DE)

(72) Inventors: Jens Barrenscheen, Munich (DE); Heimo Hartlieb, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/540,258

(22) Filed: Dec. 14, 2023

(65) Prior Publication Data
US 2024/0248858 A1     Jul. 25, 2024

(30) Foreign Application Priority Data
Jan. 23, 2023   (DE) .................. 102023101544.3

(51) Int. Cl.
  *G06F 13/16* (2006.01)
  *G06F 13/42* (2006.01)
  *H04L 45/74* (2022.01)
(52) U.S. Cl.
  CPC ...... *G06F 13/1668* (2013.01); *G06F 13/4282* (2013.01); *H04L 45/74* (2013.01)
(58) Field of Classification Search
  CPC ... G06F 13/1668; G06F 13/4282; H04L 45/74
  See application file for complete search history.

(56) References Cited

U.S. PATENT DOCUMENTS 10,841,039 B2 * 11/2020 Hoermaier ............ H04L 1/0061
11,977,508 B2 *  5/2024 Barrenscheen ......... G06F 13/20
2007/0220167 A1 *  9/2007 Golding ............... G06F 13/4291
                                                                     709/238
2008/0288662 A1 * 11/2008 Doorenbos ........... G06F 13/385
                                                                     257/47
2016/0261375 A1 *  9/2016 Roethig ................. H04L 7/041
2021/0303489 A1     9/2021 Mishra et al.
2023/0004516 A1 *  1/2023 Hegde ................. G06F 13/4282
2024/0362176 A1 * 10/2024 Rennig ................. G06F 13/362

OTHER PUBLICATIONS

Office Action from counterpart German Application No. 10 2023 101 544.3 dated Aug. 28, 2023, 6 pp.

* cited by examiner

*Primary Examiner* — Henry Tsai
*Assistant Examiner* — Christopher A Daley
(74) *Attorney, Agent, or Firm* — Shumaker & Sieffert, P.A.

(57) ABSTRACT

A method for a responder bus node is described herein. In accordance with one embodiment, the method includes receiving a first frame over a first data channel of a serial bus, wherein the first frame comprises at least a first header field with first header data and a first payload field with first payload data. The method further includes checking whether a first address, which is based on the first header data, is equal to a predetermined address. When the first address is equal to the predetermined address, a read operation is performed using a second address, which is based on the first payload data, and, when the first address is not equal to the predetermined address, a write operation is performed using the first address and the payload data. Furthermore, a corresponding method for a commander bus node, as well as a respective responder and commander bus node are described.

12 Claims, 3 Drawing Sheets

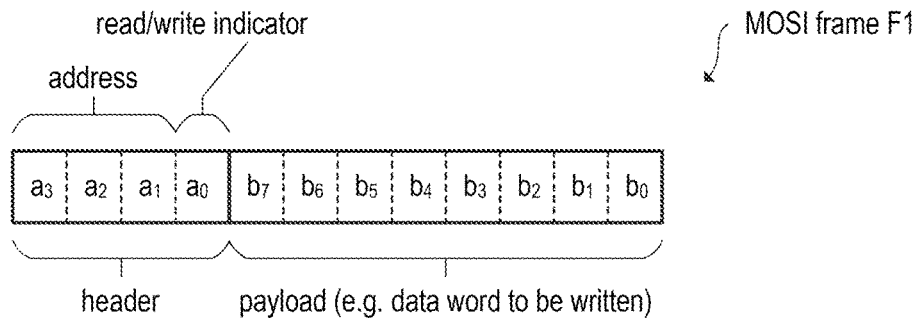
Fig. 4
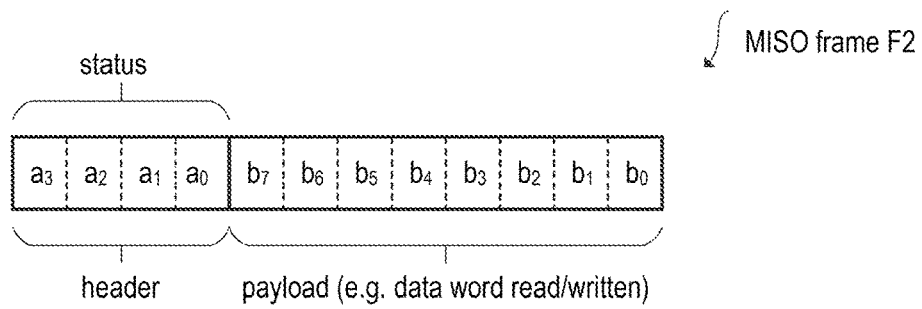
Fig. 5
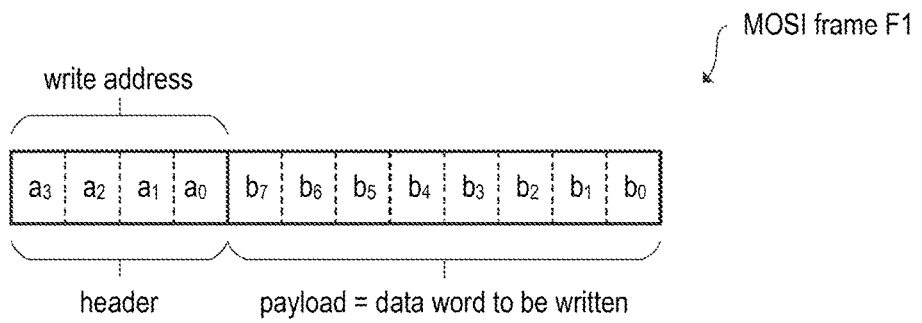
Fig. 6 (no read/write indicator, write address space doubled)
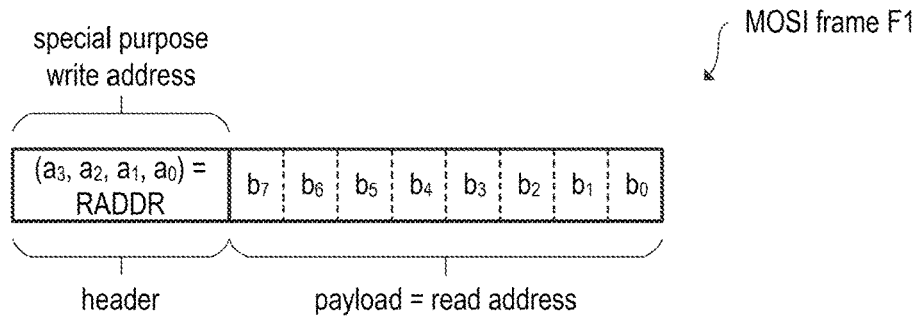
Fig. 7 (indirect read command, read address space 32-folded)

SERIAL BUS COMMUNICATION WITHOUT READ INDICATION

This Application claims priority to German Application Number 102023101544.3, filed on Jan. 23, 2023, the entire content of which is incorporated herein by reference.

The present disclosure relates to the field of frame-based serial data communication via serial data buses such as, for example, SPI (Serial Peripheral Interface), HSSL (High Speed Serial Link), MSB (Microsecond Bus), I2C bus (Inter-Integrated Circuit Bus) or the like.

BACKGROUND

Serial data communication is used in a many different applications. For example, data can be transmitted by means of serial data transmission between two chips arranged on a circuit board, between two circuits within the same chip or between two separate electronic control units (ECUs). The participants in the data communication, between which the serial data transmission takes place, are also referred to as "bus nodes". A wide variety of standardized serial bus systems are known (in some cases also proprietary standards), wherein a bus system usually includes specifications concerning the hardware, as well as a bus protocol that is used for communication. The SPI bus, for example, is widespread. The term "bus" indicates that several signals or lines are required for communication. In an SPI, in addition to the data lines (usually referred to as MISO and MOSI), there is also a line for a clock signal (usually referred to as SCK) and a line for a data frame control signal (usually referred to as chip select, CSN). These two signals determine the data transmission rate of the serially transmitted data and the length of the data frames. There are variants of SPI busses with a different number of data lines in each direction. Especially for applications with high data rates, several data lines per direction may be used, e.g. 4 or 8. In the following, the data lines per direction are referred to as data channels, regardless of the number of data lines.

The entity that generates the chip select signal and the clock signal is usually called the commander unit (commander bus node or commander for short) or, alternatively, the master unit, whereas the entity that receives these signals is usually called the responder unit (responder bus node or responder for short) or, alternatively, slave unit. Accordingly, the above-mentioned acronyms MISO for master-input-slave-output (data transfer from slave/responder to master/commander) and MOSI for master-output-slave-input (data transfer from master/commander to slave/responder) are commonly used.

In many applications, data is transmitted bidirectionally and simultaneously in both directions (full duplex), the data usually being transmitted in short sequences, which are referred to as data frames (frames for short). A frame includes a fixed number of data bits or symbols, whereby the data bits or symbols can have different meanings. For example, a group (often referred to as a "field") of data bits/symbols of a frame may represent an identifier. An identifier can, among other things, identify the sender and/or the destination of the data transmission. In particular, the identifier can represent an address to which data is to be written or from which data is to be read. Furthermore, the identifier can contain a specific command that defines what should happen to the data to be transferred (e.g. read or write). The identifier may also be part of a so-called "header" field. If an identifier is not needed, the header field may include status data or the like. Another field of a frame may contain e.g. data bits/symbols, which represent the data to be written or the data read from memory. This field is often referred to as the "payload" field because it contains the actual data of interest. Finally, another (optional) field may contain a checksum, which allows error detection (and, if necessary, error correction). The checksum can be calculated, for example, using a cyclic redundancy check (CRC). However, other methods are also known, such as error correction codes (ECC) or the like.

In many applications, the length of a frame is relatively short, e.g. 12 bits, 16 bits, or 32 bits, wherein most of the bits (or symbols are used for the payload field). Accordingly, in an exemplary system with a frame length of 12 bits the header may have, e.g., only four bits that may be used to identify read and write addresses. Usually, one bit is used as read/write indicator (e.g. 0=read, 1=write) and the remaining three bits can be used to code an address. In the present example, the address space includes $2^3=8$ write addresses and the same number of read addresses. It is understood, that the read/write indicator may be interpreted as part of the address. In this case, the address space would contain $2^4=16$ addresses partly being read addresses and partly being write addresses.

In many applications, it is desirable or necessary for a bus commander unit to read a lot of different data (various measured parameters, status parameters, etc.) and, therefore, the limited address space for read addresses is a problem. Of course, this problem could be easily solved by using longer frames with longer header fields to increase the address space. However, this would inevitably increase the time required to transmit and thus also the latency between a read command and the corresponding response. Another limiting factor for the frame length lies in the construction of the data buffers in the commander unit. In most cases, they are built as 16- or 32-bit wide buffers, so handling for example 35 bits would require two data words to be handled to fill a write buffer or empty a receive buffer in the commander unit. As a consequence, it is much simpler to restrict the frame length to the "natural" data word length of the handling unit. The inventors set themselves the objective of improving existing concepts and, more particularly, increasing the available address space for read addresses without increasing the required frame length used for serial communication.

SUMMARY

The mentioned objective is solved by the methods and the bus nodes described herein. Various embodiments and further developments are covered by the dependent claims.

A method for a responder bus node is described herein. In accordance with one embodiment, the method includes receiving a first frame over a first data channel of a serial bus, wherein the first frame comprises at least a first header field with first header data and a first payload field with first payload data. The method further includes checking whether a first address, which is based on the first header data, is equal to a predetermined address. When the first address is equal to the predetermined address, a read operation is performed using a second address, which is based on the first payload data, and, when the first address is not equal to the predetermined address, a write operation is performed using the first address and the payload data.

Further, a corresponding method for a commander bus node is described. In accordance with one embodiment, the method includes transmitting a first frame over a first data channel of a serial bus, wherein the first frame comprises at least a first header field with first header data and a first payload field with first payload data. To generate a read command, the first header data represents a predetermined address and the payload data represents the address from which a recipient of the first frame is expected to read data.

Furthermore, respective commander and responder bus nodes are described. In one embodiment, the bus responder node includes an interface circuit configured to receive a first frame over a first data channel of a serial bus, wherein the first frame comprises at least a first header field with first header data and a first payload field with first payload data. The bus node further includes a frame decoder configured to check and indicate whether, or not, a first address, which is based on the first header data, is equal to a predetermined address, and a control logic that is configured to: perform a read operation using a second address, which is based on the first payload data, when the frame decoder indicates that the first address is equal to the predetermined address, and to perform a write operation using the first address and the first payload data, when the frame decoder indicates that the first address is not equal to the predetermined address.

In one embodiment, the bus commander node includes an interface circuit configured to generate a first frame comprising at least a first header field with first header data and a first payload field with first payload data, wherein to generate a read command, the first header data represents a predetermined address and the payload data represents the address from which a recipient of the first frame is expected to read data. The interface circuit of the commander bus node is further configured to transmit the first frame over a first data channel of a serial bus.

BRIEF DESCRIPTION OF THE DRAWINGS

In the following detailed description, reference is made to the accompanying drawings. The drawings form a part of the description and, for the purpose of illustration, show examples of how the invention may be used and implemented. It is to be understood that the features of the various embodiments described herein may be combined with each other, unless specifically noted otherwise.

FIG. 4 illustrates an example of a MOSI frame which is sent by the bus commander and which uses a read/write indicator in the frame header to distinguish read form write commands.

FIG. 5 illustrates an example of a MISO frame which is sent by the bus responder in response to a read or write command.

FIG. 6 illustrates an example of a MOSI frame, which does not include a read/write indicator. The address in the frame header is generally interpreted as an address for a write operation.

FIG. 7 illustrates how a read command can be transmitted in with a frame that is constructed in accordance with FIG. 6.

DETAILED DESCRIPTION

Figure 1:
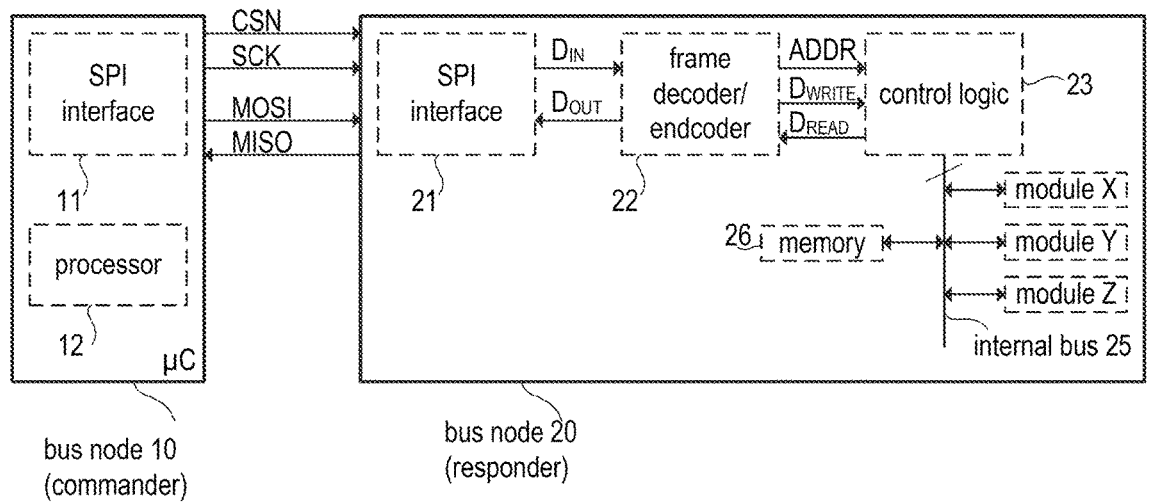
FIG. 1 illustrates an example of a system with two bus nodes that are connected via an SPI bus.

FIG. 1 illustrates an example of a system with two bus nodes connected via an SPI bus. However, the exemplary embodiments described here are not limited to an SPI bus, but the concepts described here can also be applied to any other serial bus systems such as, for example, HSSL (High Speed Serial Link), MSB (Microsecond Bus), I2C bus (Inter-Integrated Circuit Bus) or the like.

The bus node 10 shown in FIG. 1 is referred to as a controller or as a commander bus node, which controls the bus communication. The bus node 10 can be, for example, a microcontroller with an SPI interface 11 and at least one processor 12 which uses a certain data words length (e.g. 32 bits) and which is configured to execute software (firmware) instructions stored in a memory in order to implement the concepts, functions and method steps described here. The processor 12 may write data words to a write buffer of the SPI interface 11 and read data words from a receive buffer of the SPI interface 11. Programmable microcontrollers with an SPI interface are as such known and are therefore not described in more detail here. However, it is understood that the bus node 10 does not necessarily have to have a processor for executing software instructions. Additionally or instead, hardwired or one-time programmable (OTP) logic may also be used. A combination of software (executed by a processor) and hard-wired logic may also be used.

In the depicted example, the SPI interface 11 of the bus node 10 is connected to a corresponding SPI interface 21 of a further bus node 20 via a number of bus lines which, in the case of an SPI bus, are usually denoted as CSN (Chip Select), SCK (Serial Clock), MOSI (Master Out/Slave In) and MISO (Master In/Slave Out). Bus node 20 may contain data storage locations that can be accessed by the commander unit. Data storage locations written with data by the commander unit may influence the operation or the behavior of a module in bus node 20. Data storage locations read by the commander unit may deliver status information or measurement results related to the operation of a module in bus node 20.

The signals transmitted via the respective bus lines are also denoted by CSN, SCK, MOSI and MISO. The commander bus node determines the time windows, in which frames are sent (by setting CSN to a specific logic level), and also the data transmission rate (by generating the shift clock signal SCK). In addition thereto, the commander bus node also defines whether and which data storage location is read or written in the responder unit (read and write are defined from commander bus node's the point of view). In some applications the signal CSN is optional. The CSN signal may particularly be used when several slave bus nodes are connected to a bus controller (commander bus node).

The shift clock signal SCK is usually a generated by the commander bus node 10 for synchronizing the data transmission on the data channels MISO and MOSI. The MOSI data channel (with at least one data line) is used for data transmission from the commander bus node 10 to the responder bus node 20 (downlink), and the MISO data channel (also with at least one bus line) is used for data transmission in the other direction (uplink). In full duplex data transmission, data is transmitted on both data channels, MOSI and MISO, simultaneously and synchronously to the clock signal SCK. Unless the in-frame response (IFR) concept is used (which is not the case for the embodiments described herein), each response frame generated by the responder bus node 20 is transmitted in the time window that is subsequent to the time window, in which the commander bus node 10 sent the corresponding read command. This technique is called next-frame response (NFR).

As described above, the serial data transmission is based on frames (MOSI frames from bus node 10 to bus node 20;

MISO frames from bus node 20 to bus node 10). The structure of a frame will be explained in more detail later. The data $D_{IN}$ received from the SPI interface 21 is forwarded to a frame decoder/encoder 22 in the bus node 20. In the other direction, the frame decoder/encoder 22 supplies the data $D_{OUT}$ to be transmitted to the SPI interface 21. The frame decoder/encoder 22 is configured to "unpack" and, as the case may be, validate the data contained in a MOSI frame and to "pack" the raw data to be sent in a MISO frame and, as the case may be, add a checksum or the like to frame to secure the transmitted data.

Validating and securing data contained in a frame typically includes calculating or verifying a checksum. In some of the exemplary embodiments, the cyclic redundancy check (CRC) is used to calculate and verify checksums, wherein other algorithms may also be used for calculating and verifying checksums. In the simplest case, the checksum consists of one or more parity bits, or even no protection at all. Various CRC methods or CRC polynomials and other methods for determining and verifying checksums are known per se and are therefore not explained in detail here. In general, the frame decoder/encoder 22 may add a checksum to the (raw) data $D_{READ}$ that is packed into a frame (to be sent), and may verify the checksum contained in a (received) frame to check the integrity of the received data. As mentioned, securing data using checksums is not mandatory and can be omitted in less critical applications.

In the case of a write access, bus node 10 writes data $D_{WRITE}$ to address ADDR in bus node 20. For this, the address ADDR and the data $D_{WRITE}$ must be transmitted in at least one MOSI frame. In the case of a read access, bus node 20 reads data $D_{READ}$ from an address ADDR of bus node 20 and transmits the read data to bus node 10. For this, the address ADDR must be transmitted in a MOSI frame and the read data $D_{READ}$ must be sent in at least one MISO frame. The address ADDR identifies a memory location in the modules X, Y or Z or in the memory 26 of bus node 20 to which data is to be written or from which data is read.

The data received in a MOSI frame in the (responder) bus node 20 is denoted $D_{WRITE}$ and ADDR in the present example, and is supplied to a control logic 23. The data sent in a MISO frame from the bus node 20 is output, to the frame decoder/encoder 22, by the control logic 23 and is designated $D_{READ}$ in the present example. The structure of a frame and the meaning of the data it contains will be explained in more detail later (cf. FIG. 3). The control logic 23 is configured to access, for example, a memory 26 and one or more modules X, Y, Z (e.g. one more registers as data storage locations within the modules) via an internal data bus 25. A module may be any data source or data sink. In a simple example, a module is a simple semiconductor switch that can be turned on or off by a specific command or that provides a value for the current flowing through the (closed) switch upon request. A module may also be a sensor that provides regularly updated measured values (e.g. a temperature). In a simple example, a memory is an element that can store written data and make it available again for readout on demand (e.g. based on flip-flops, RAM cells, etc.).

Figure 2:
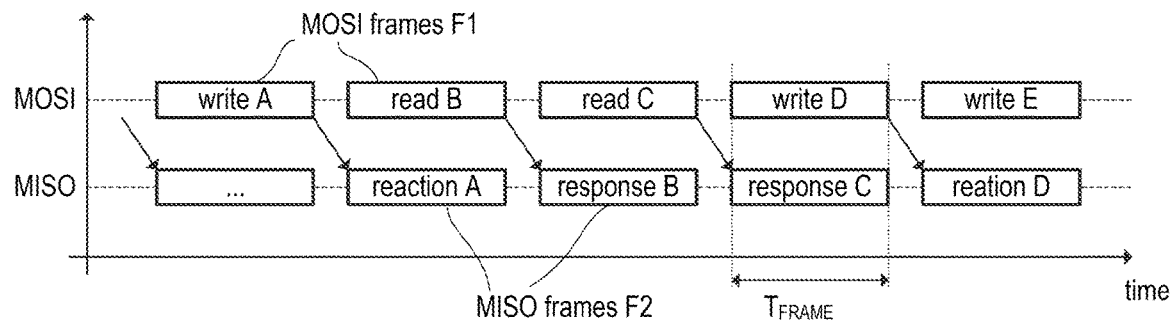
FIG. 2 schematically illustrates the frame-based full-duplex bus communication via a serial bus.

FIG. 2 schematically illustrates frame-based full-duplex data transmission via a serial bus, wherein a sequence of frames is transmitted via both, the MOSI data channel and the MISO data channel. The frames F1 transmitted over the MOSI data channel (i.e. the data contained therein) can be interpreted as commands in the depicted example, for example, as write and read commands (e.g. "write A", "read B", etc.) dependent on whether the address included in the frame header is a read address or a write address or dependent on the read/write indicator included in the frame header. The frames F2 transmitted via the MISO data channel contain the responses to the respective commands (e.g. the data read from a register/memory location).

MISO and MOSI Frames are transmitted simultaneously. In the examples described herein, "simultaneously" is understood to mean that the two frames (to and from the bus commander) overlap at least in time. In the depicted embodiment, a MISO frame is transmitted in the same time window, in which a MOSI frame is transmitted (see FIG. 2, time window of length $T_{FRAME}$). Especially in the case of an SPI, the transmission is isochronous, since both frames (apart from unavoidable run-time effects) start and end essentially at the same time instants. MISO and MOSI frames are transmitted synchronously to a shift clock signal (generated by the bus node 10 and output to the SCK line), as is the case for a simple SPI bus. For higher data rates (e.g., above 10 Mbaud), MOSI and MISO may refer to separate shift clock signals.

Figure 3:
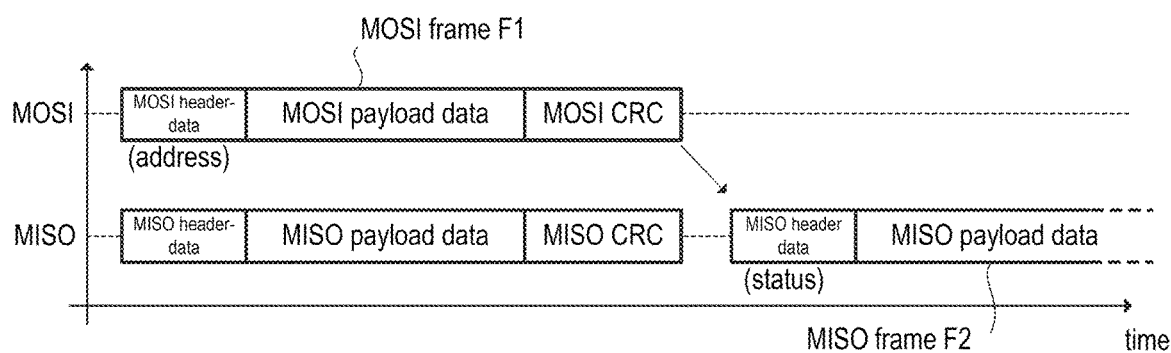
FIG. 3 schematically illustrates the content of the transmitted frames in more detail.

In systems with a next-frame response (NFR) structure, the response to a command transmitted in a MOSI frame is transmitted in a subsequent MISO frame, usually in the MISO frame which is transmitted directly after the MOSI frame, which included the respective command. In this case, the MISO frames F2 lag behind the corresponding MOSI frames F1 by at least one frame duration. FIG. 3 shows this concept in more detail.

As shown in FIG. 3, each frame (MOSI and MISO frames) comprises at least a first field (header field) containing header data, a second field (payload field) containing payload data, and optionally a third field (checksum field) containing a checksum. In general, the responder bus node (e.g. bus node 20) can perform a certain function depending on the data contained in a MOSI frame F1. This may depend, for example, on the header data. The header data may designate an address (e.g., a memory location/register) for a read or a write operation. A part of the header data (in a simple case only one bit) indicates whether a write or read operation is to be performed (read/write indicator). However, the information concerning the function/operation to be performed can also be considered as part of the address. In the case of a write operation, the data to be written is in the payload data field of the MOSI frame F1. In the case of a read operation, the payload data of the MOSI frame F1 may be dummy data (e.g. a sequence of zeros), since they may be irrelevant for the read operation and disregarded by the responder bus node 20. The checksum in the checksum field of the MOSI frame F1 (MOSI CRC) secures the data of the MOSI frame contained in the header field and in the payload field. This means for the example shown that the CRC checksum (MOSI CRC) is calculated in the commander bus node 10 based on the header data and the payload data.

Once the responder bus node 20 has received a MISO frame F1 (and optionally checked for data integrity), it performs the function requested by the commander bus node (e.g. a read operation). The response (e.g. the data $D_{READ}$ read from a register at location ADDR specified in the header of the MOSI frame F1) is transmitted in the payload field of the next MISO frame F2. The header field of the MISO frame F2 may include dummy data (e.g., a sequence of zeros). Alternatively, the data in the header field may depend on the received MOSI header data, or may be, for example, status information indicating the current status of the bus node 20 (e.g., independent of the operation currently being performed). In one example, the header data (ADDR) currently received in the MOSI frame F1 is copied bit by bit to the header data field of the subsequent MISO frame F2 (status information equals MOSI header data). The checksum in the checksum field of the MISO frame F2 (MISO CRC) secures the payload data of the MISO frame F2 and also the header data of the MISO frame F2. In the depicted example, this means that the CRC checksum (MISO CRC) included in the MISO frame F2 is calculated in the responder bus node 20 (e.g. in the frame decoder/encoder 22) based on the payload data and the header data of the MISO frame F2.

FIGS. 4 and 5 illustrate the structure of MISO and MOSI frames in more detail. As mentioned, the checksum field is optional and is thus omitted in the following examples to keep the illustrations simple. FIG. 4 illustrates an example of a MOSI frame F1 that includes a 4-bit header field and an 8-bit payload field (12 bits total frame length). The four bits $a_3$, $a_2$, $a_1$, and $a_0$, may be interpreted as a 3-bit address ($a_3$, $a_2$, $a_1$) and a read/write indicator $a_0$. Accordingly, eight different read addresses and eight different write addresses are available in this example (from binary 000 to 111). Alternatively, the four bits $a_3$, $a_2$, $a_1$, and $a_0$, may be interpreted as a 4-bit address ($a_3$, $a_2$, $a_1$, $a_0$), wherein the addresses ($a_3$, $a_2$, $a_1$, 0) are read addresses and the addresses ($a_3$, $a_2$, $a_1$, 1) are write addresses. It is understood that both interpretations are equivalent. The payload field includes eight bits denoted as $b_7$, $b_6$, $b_5$, $b_4$, $b_3$, $b_2$, $b_1$, and $b_0$.

FIG. 5 illustrates an example of a MISO frame F2 that has the same frame length as the corresponding MOSI frame and thus also includes a 4-bit header field and an 8-bit payload field. As each MISO frame is sent in response to a corresponding MOSI frame, the MISO frames F2 do not have to include an address in the header field. In some embodiments, the header may include status data. In other embodiments the address included in a MOSI frame F1 received by the responder bus node 20 is copied to the corresponding response (MISO) frame F2. This allows the bus commander node 10 to check whether the address was correctly received by the responder bus node 20. If a MOSI frame F1 received by the responder bus node 20 includes a read command, then the corresponding response frame F2 includes the requested data in the payload field. If a MOSI frame F1 received by the responder bus node 20 includes a write command, then the corresponding response frame F2 may include dummy data (e.g. a series of zeros) in the payload field. However, in some embodiments, the written data is sent back to the bus commander node 10 in the payload field of the response frame F2. This allows the bus commander node 10 to check whether the payload data was correctly received and executed by the responder bus node 20.

As mentioned in the introduction, it may be desirable to increase the address space for read and write commands. This could be obviously achieved by increasing the length of the header field. However, dependent on the application, this is undesired or impossible because longer frames would result in a longer delay (latency) between a MOSI frame F1 and the respective response frame. The concept discussed below allows—for a given frame length and a given frame structure—to significantly increase the address space for read and write commands (particularly for read commands).

FIG. 6 illustrates an example of a MOSI frame F1, which does not include a read/write indicator. The address represented by the header data included in the frame header is generally interpreted as an address for a write operation. In the present example, the four bits $a_3$, $a_2$, $a_1$, and $a_0$, are interpreted as a 4-bit address ($a_3$, $a_2$, $a_1$, $a_0$) that can be used in write operations. The payload field again includes eight bits denoted as $b_7$, $b_6$, $b_5$, $b_4$, $b_3$, $b_2$, $b_1$, and $b_0$ (payload data). The payload data generally represents the data written to the address ($a_3$, $a_2$, $a_1$, $a_0$). Using the structure of the frame F1 shown in FIG. 6, a bus commander (see FIG. 1, bus node 10) can send write commands to the bus responder (see FIG. 1, bus node 20).

FIG. 7 illustrates how the bus commander implements a read command when using frames without a read/write indicator (or without any other mechanism to divide the available address space into read addresses and write addresses). In accordance with FIG. 7, a special write operation is defined, which uses a specific, predetermined (by design) address RADDR. RADDR may be any arbitrary (but predetermined for a specific application) address, e.g. RADDR=0000 or RADDR=1111 in case of 4-bit addresses. All other addresses of the address space can be used in normal write operations, e.g. to address specific memory locations in the responder. When using the address RADDR to generate the frame header, the payload data represents another address, which the recipient of the frame (i.e. the responder, bus node 20) will interpret as an address for a read operation. Accordingly, the special address RADDR may be considered as identifying a memory location (in the responder) to which the read address, which is included in the payload filed of the frame, is written. The responder can then use the read address in a read operation.

It is understood that the RADDR does not necessarily have to identify a physical memory location. It may be used by the frame decoder 22 of the responder (bus node 20) to identify the special write command (which is actually a read command). The frame decoder 22 may extract the read address from the payload field of a received frame when the header field includes the address RADDR. In the depicted example (i.e. 4-bit header field) the available address space includes $2^4$=8 addresses, i.e. the special address RADDR and seven addresses for write operations. As mentioned, if the address included in the header field is RADDR then the payload filed is interpreted as address. In the depicted example, an 8-bit payload field is used and, thus, the available address space includes $2^8$=256 addresses for read operations.

Figure 8:
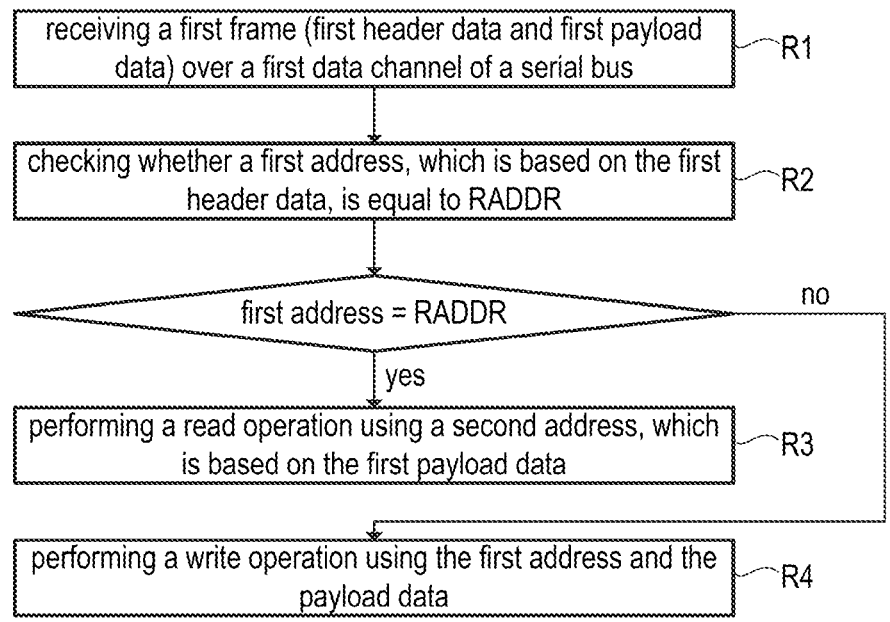
FIGS. 8 and 9 are flow charts illustrating exemplary methods (for sender and receiver) for communicating across a serial bus with frames that are constructed in accordance with FIGS. 6 and 7.
Figure 9:
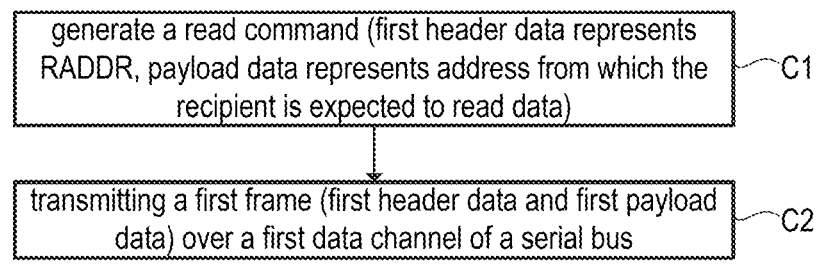

Various aspects of the concept described above will now be summarized with reference to the flow charts of FIGS. 8 and 9. It is understood that the following is not an exhaustive list of features but rather an exemplary summary.

A first embodiment relates to a method for a responder bus node. Accordingly, the method includes receiving a first frame (e.g. the MOSI frame shown in the example of FIG. 1) over a first data channel of a serial bus (see FIG. 8, step R1). The first frame includes at least a first header field comprising first header data and a first payload field comprising first payload data. The method further includes checking whether a first address, which is based on the first header data, is equal to a predetermined address RADDR (see FIG. 8, step R2). Furthermore, the method comprises performing a read operation using a second address, which is based on the first payload data, when the first address is equal to the predetermined address RADDR (see FIG. 5, step R3), and, performing a write operation using the first address and the payload data, when the first address is not equal to the predetermined address RADDR (see FIG. 5, step R4).

In one embodiment, the second address is extracted from the first payload field. In the read operation data is read from the second address. In the write operation at least parts of the payload data is written to the first address, which is extracted from the first payload field. In the step R2, the first address may be extracted from the first header field and then it can be determined whether the first address is equal to the predetermined address RADDR.

In one embodiment, the method further includes generating a second frame (e.g. the MISO frame shown in the example of FIG. 1). The second frame includes at least a second payload field comprising second payload data that is based on data read from the second address. The second frame may be transmitted over a second data channel of the serial bus during a second time window that is subsequent to a first time window, in which the first frame was received (Next-Frame-Response concept, see FIGS. 2 and 3).

A further embodiment is related to a method for a commander bus node. Accordingly, the method includes generating a read command by generating a first frame, in which the first header data represents the predetermined address RADDR and the payload data represents the address from which a recipient of the first frame is expected to read data (see FIG. 5, step C1), and the method further includes transmitting the first frame over a first data channel of a serial bus (see FIG. 5, step C2).

Another embodiment is related to a bus node that acts as a bus responder. Accordingly, the responder bus node includes a bus interface (see, e.g. FIG. 1, SPI interface 21) that is configured to receive a first frame over a first data channel of a serial bus. The first frame includes at least a first header field comprising first header data and a first payload field comprising first payload data. The bus node further includes a frame decoder (see, e.g. FIG. 1, frame encoder/decoder 22) that is configured to check and indicate whether, or not, a first address, which is based on the first header data, is equal to a predetermined address RADDR. Moreover, the bus node includes a control logic (see, e.g. FIG. 1, logic circuit 23) that is configured to perform a read operation using a second address, which is based on the first payload data, when the frame decoder indicates that the first address is equal to the predetermined address RADDR, and to perform a write operation using the first address and the first payload data, when the frame decoder indicates that the first address is not equal to the predetermined address.

A further embodiment is related to a bus node that acts as bus commander. Accordingly, the commander bus node includes an interface circuit (sec, e.g., FIG. 1, SPI interface 11) that is configured to generate a first frame. The first frame includes at least a first header field comprising first header data and a first payload field comprising first payload data. To generate a read command, the first header data represents the predetermined address RADDR and the payload data represents the address from which a recipient of the first frame is expected to read data. Moreover, the interface circuit of the bus node is configured to transmit the first frame over a first data channel of a serial bus. In this example, the data, which is processed by the interface circuit to compose the first frame, is provided by a processor 12, which may be part of a microcontroller or the like. As mentioned, the processor is configured to execute software (firmware) instructions stored in a memory in order to implement the concepts, functions and method steps (see e.g. FIG. 9) described in this disclosure.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

The invention claimed is:

1. A method comprising:
   receiving a first frame over a first data channel of a serial bus, the first frame comprising at least a first header field comprising first header data and a first payload field comprising first payload data;
   checking whether a first address, which is based on the first header data, is equal to a predetermined address; and
   when the first address is equal to the predetermined address, performing a read operation using a second address, which is based on the first payload data, and
   when the first address is not equal to the predetermined address, performing a write operation using the first address and the first payload data.

2. The method of claim 1,
   wherein the read operation includes reading data from the second address, which is extracted from the first payload field.

3. The method of claim 1,
   wherein the write operation includes writing at least parts of the first payload data to the first address.

4. The method of claim 1,
   wherein the checking comprises extracting the first address from the first header field and determining whether the first address is equal to the predetermined address.

5. The method of claim 1, further comprising:
   generating a second frame, the second frame comprising at least a second payload field comprising second payload data,
   wherein, the second payload data is based on data read from the second address.

6. The method of claim 5, further comprising:
   transmitting the second frame over a second data channel of the serial bus during a second time window that is subsequent to a first time window, in which the first frame was received.

7. A bus node comprising:
   an interface circuit configured to receive a first frame over a first data channel of a serial bus, the first frame comprising at least a first header field comprising first header data and a first payload field comprising first payload data;
   a frame decoder configured to check and indicate whether, or not, a first address, which is based on the first header data, is equal to a predetermined address; and
   a control logic configured to:
   perform a read operation using a second address, which is based on the first payload data, when the frame decoder indicates that the first address is equal to the predetermined address; and
   perform a write operation using the first address and the first payload data, when the frame decoder indicates that the first address is not equal to the predetermined address.

8. The bus node of claim 7,
   wherein the frame decoder is configured to extract the second address from the first payload field, and wherein to perform the read operation the control logic is configured to receive the second address from the frame decoder and to read data from the second address.

9. The bus node of claim 7, wherein to perform the write operation the control logic is configured to write at least parts of the first payload data to the first address.

10. The bus node of claim 7, wherein to check whether, or not, the first address is equal to the predetermined address, the frame decoder is configured to extract the first address to from the first header field and to determine whether the first address is equal to the predetermined address.

11. The bus node of claim 7, further comprising a frame encoder configured to generate a second frame, wherein the second frame includes at least a second payload field comprising second payload data, and wherein the second payload data is based on data read from the second address.

12. The bus node of claim 11, wherein the frame encoder is further configured to transmit the second frame over a second data channel of the serial bus during a second time window that is subsequent to a first time window, in which the first frame was received.

* * * * *